Nov. 13, 1928.
F. M. FURBER
1,691,278
MACHINE FOR USE IN THE MANUFACTURE OF SHOES
Original Filed Aug. 2, 1919    9 Sheets-Sheet 1
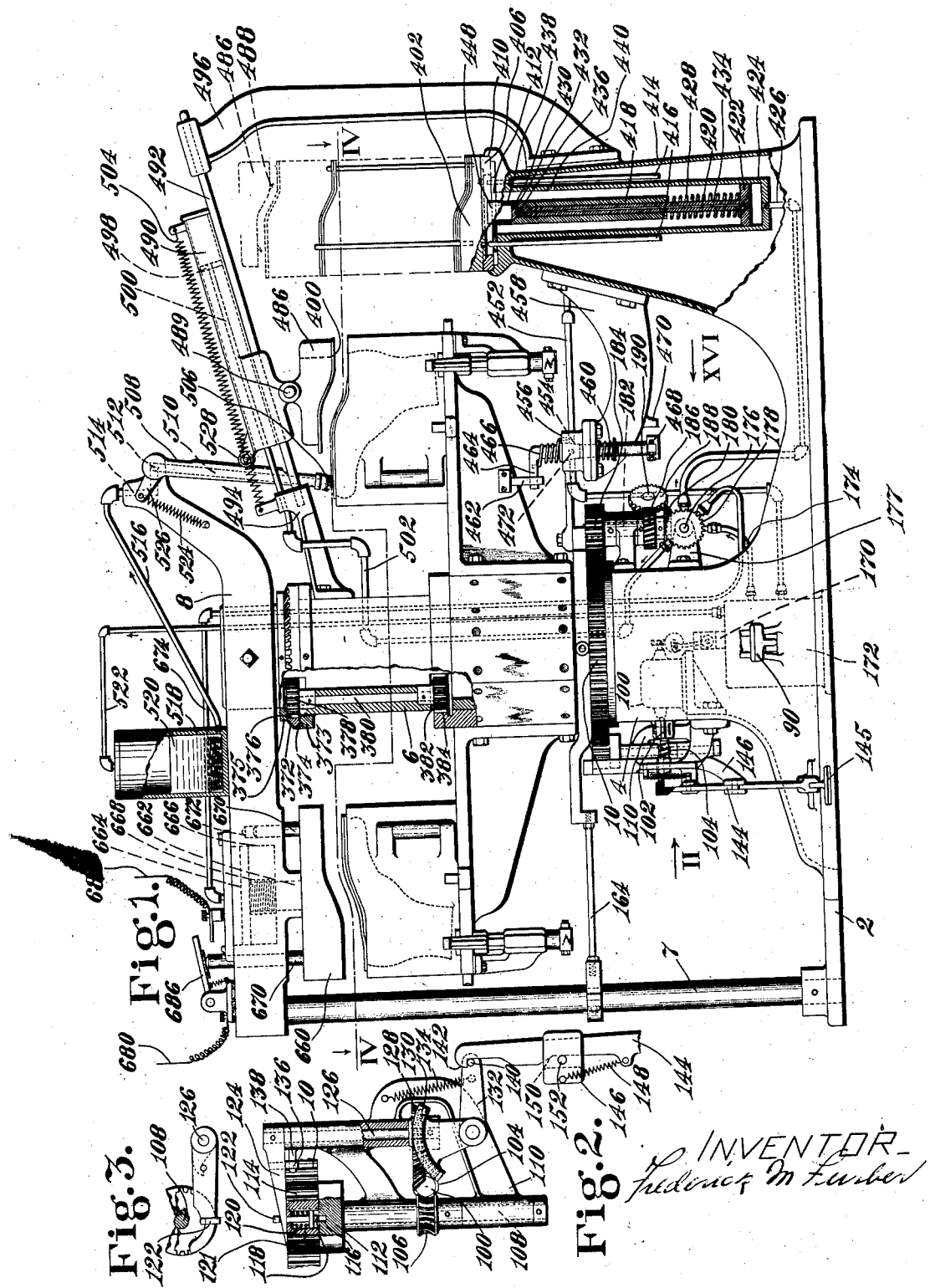

Nov. 13, 1928. 1,691,278
F. M. FURBER
MACHINE FOR USE IN THE MANUFACTURE OF SHOES
Original Filed Aug. 2, 1919  9 Sheets-Sheet 2
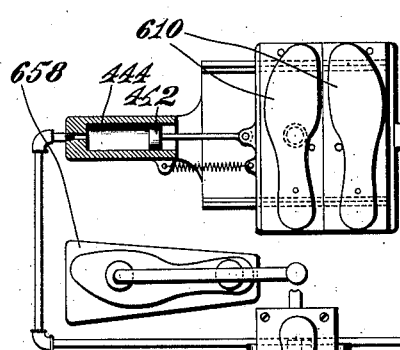
Fig.4.
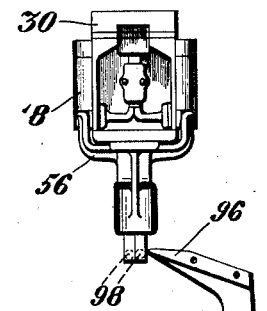
Fig.6.
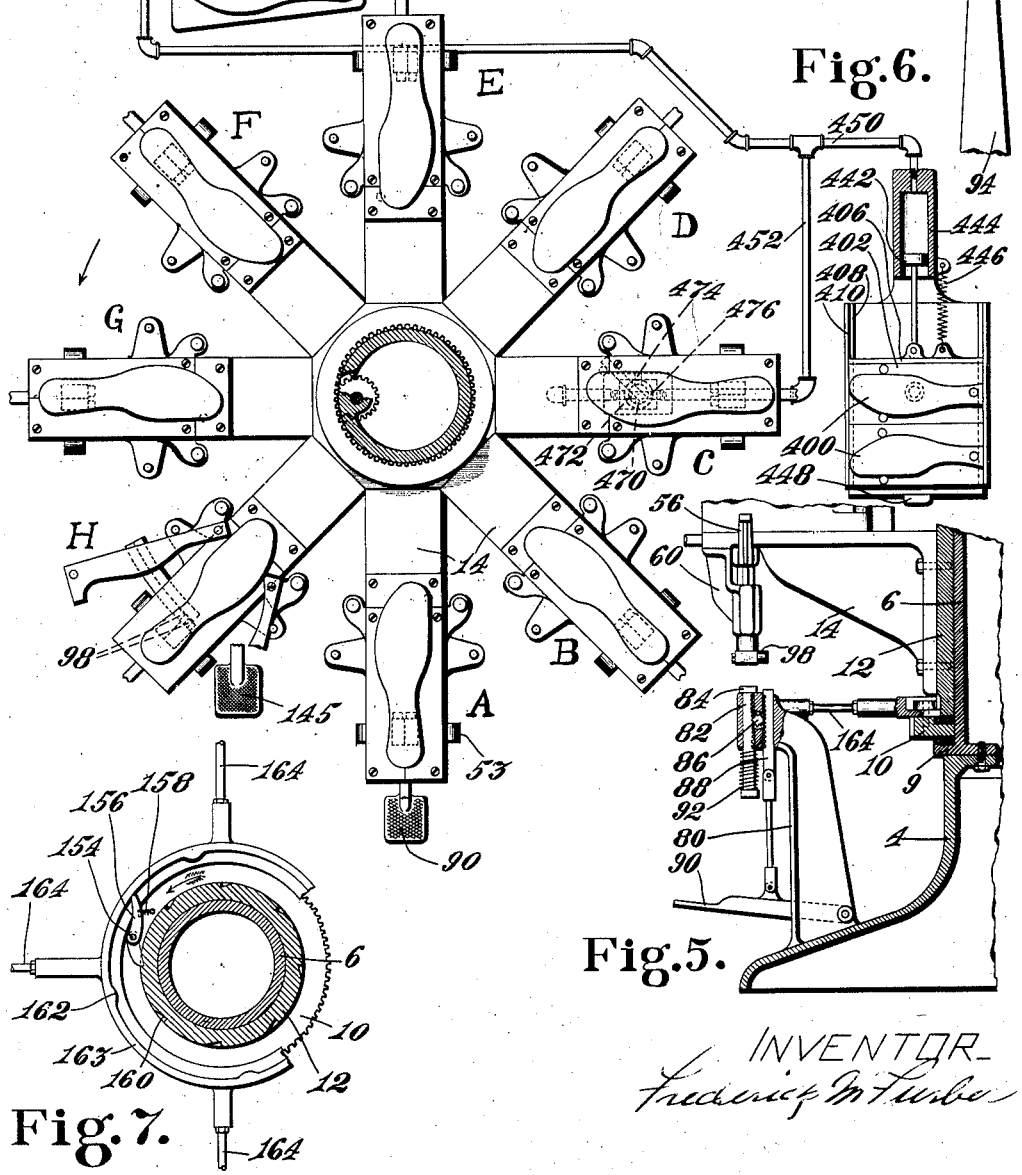
Fig.5.
Fig.7.
INVENTOR
Frederick M Furber Nov. 13, 1928. 1,691,278
F. M. FURBER
MACHINE FOR USE IN THE MANUFACTURE OF SHOES
Original Filed Aug. 2, 1919 9 Sheets-Sheet 4
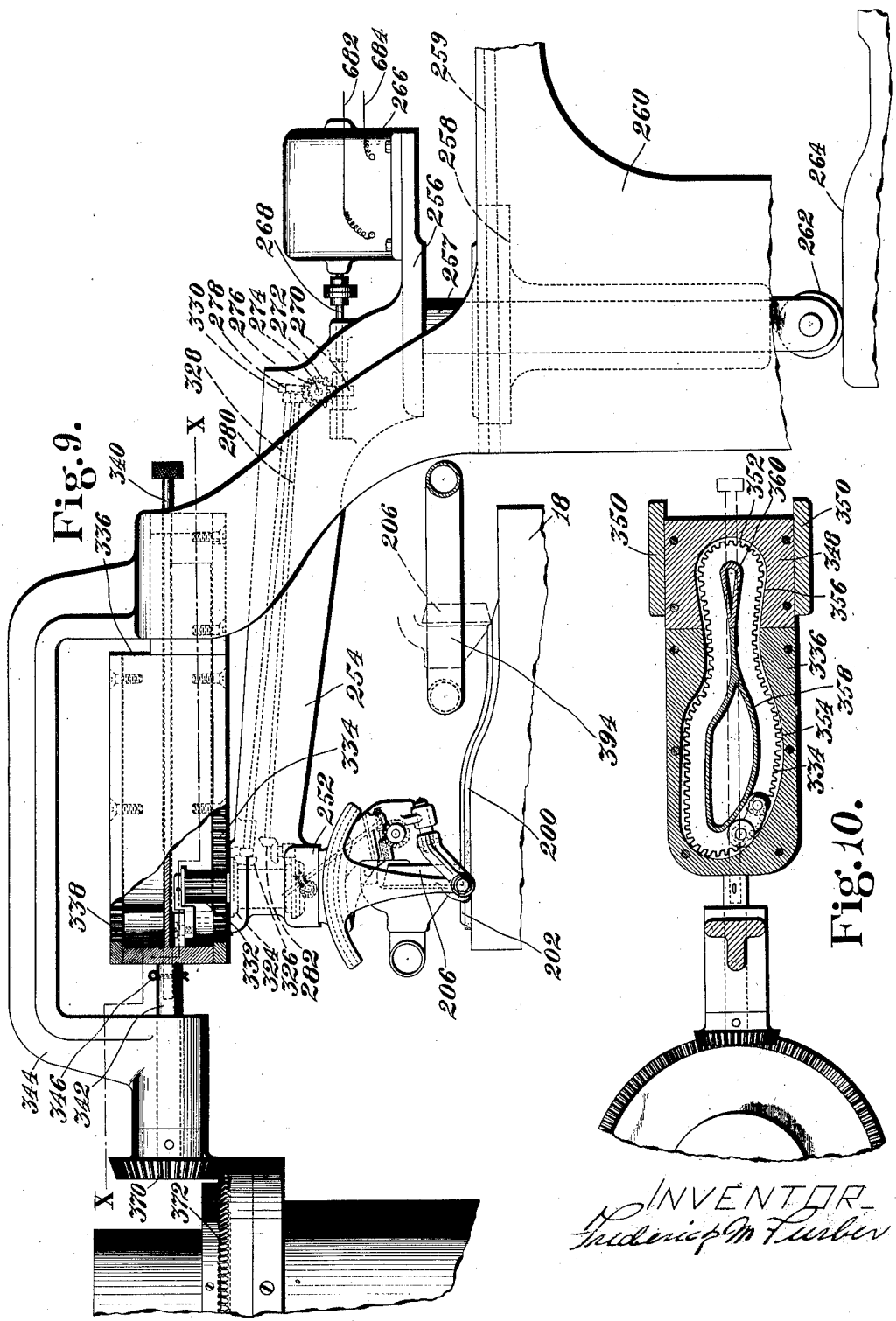

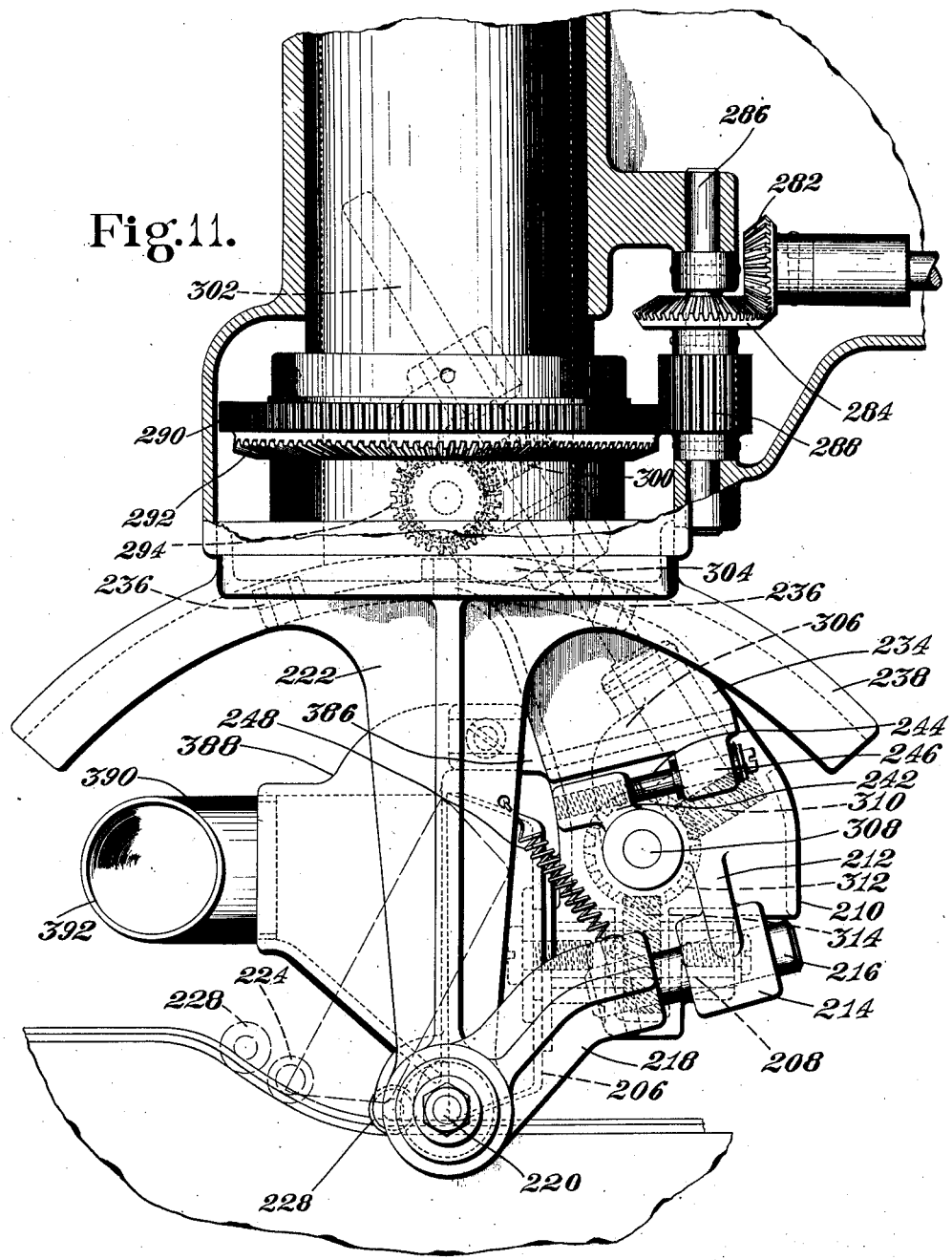

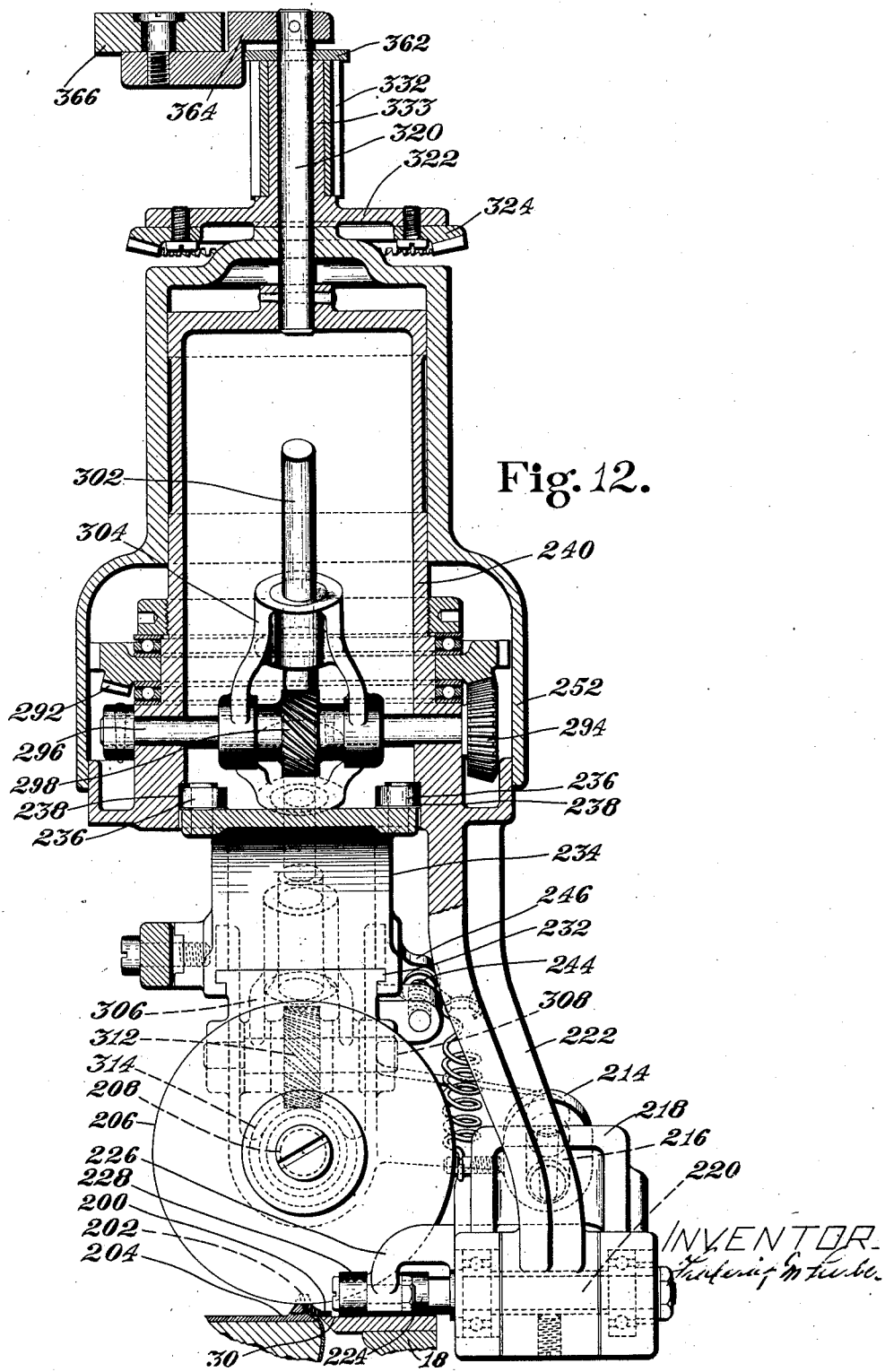

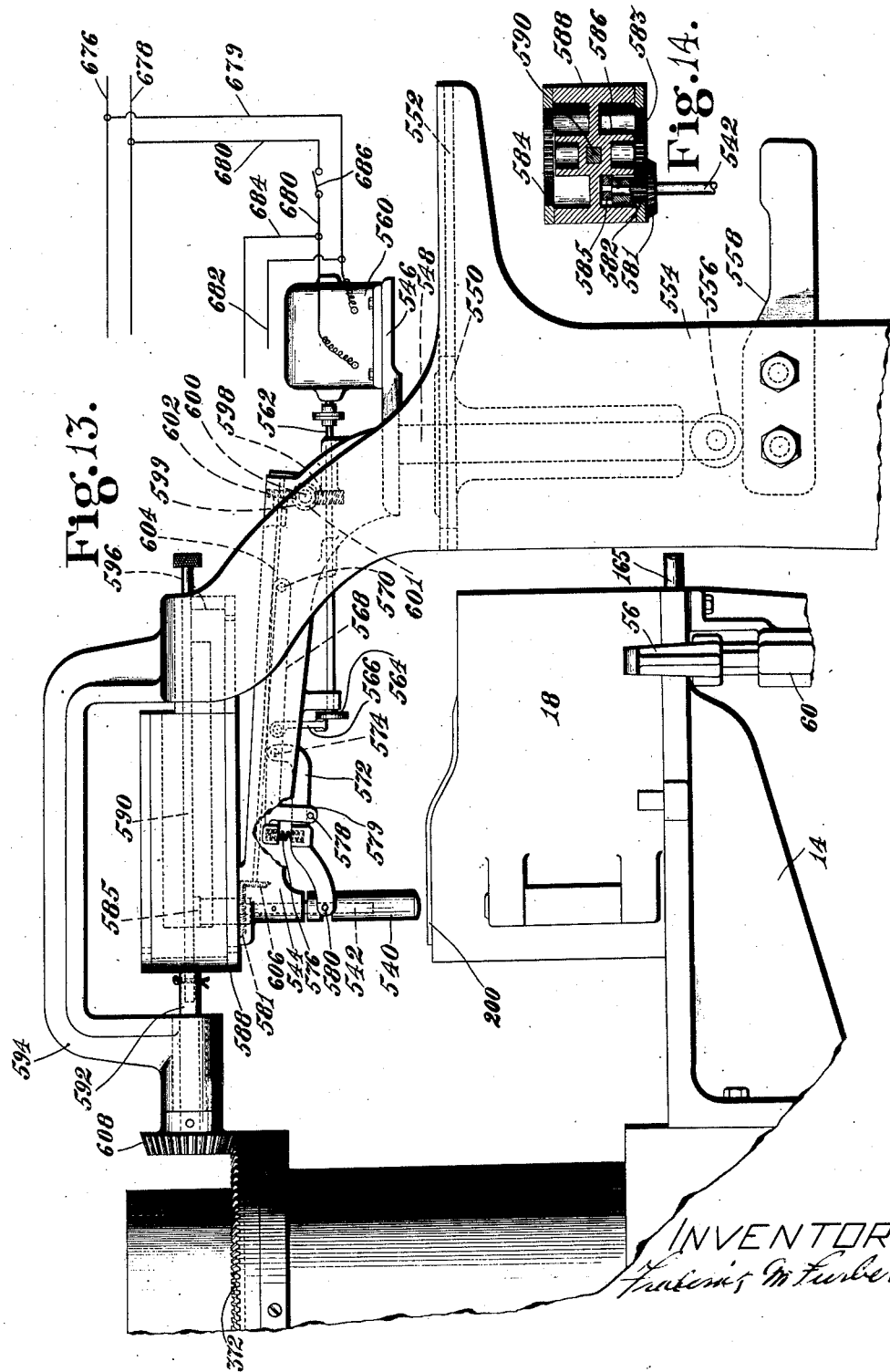

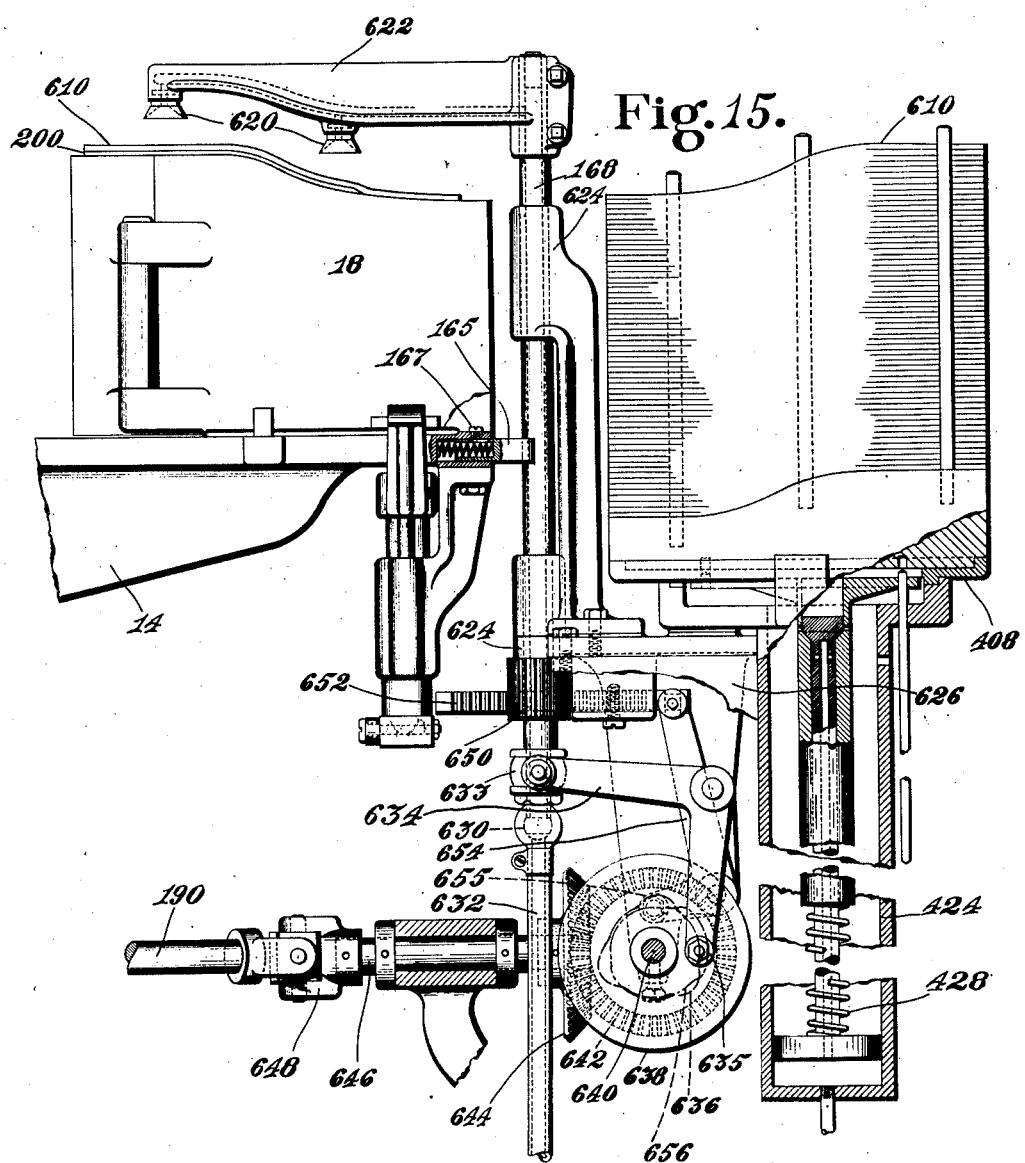

Nov. 13, 1928.                                                              1,691,278
F. M. FURBER
MACHINE FOR USE IN THE MANUFACTURE OF SHOES
Original Filed Aug. 2, 1919    9 Sheets-Sheet 9
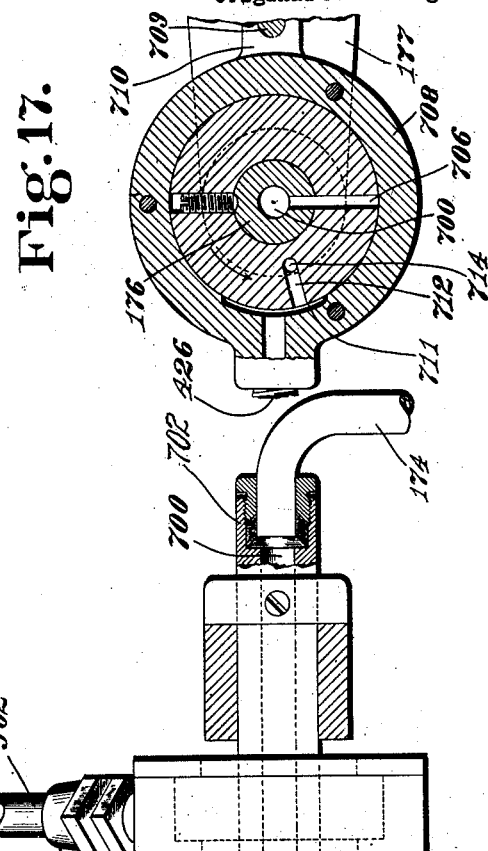
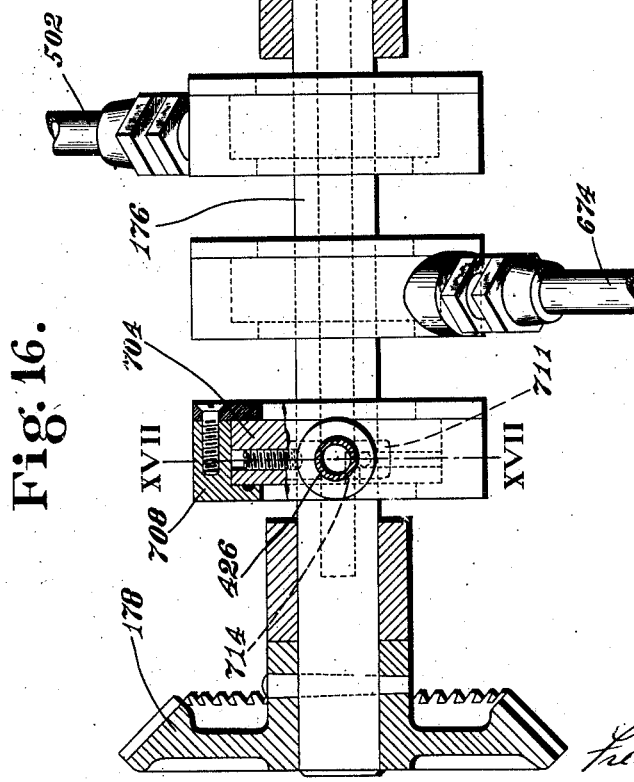
INVENTOR
Frederick M Furber Patented Nov. 13, 1928.

1,691,278

UNITED STATES PATENT OFFICE.

FREDERICK M. FURBER, OF REVERE, MASSACHUSETTS, ASSIGNOR TO UNITED SHOE MACHINERY CORPORATION, OF PATERSON, NEW JERSEY, A CORPORATION OF NEW JERSEY.

MACHINE FOR USE IN THE MANUFACTURE OF SHOES.

Application filed August 2, 1919, Serial No. 314,947. Renewed February 4, 1928.

This invention relates to machines used in the manufacture of shoes and more particularly in the bottoming of shoes.

An important object of the invention is to provide a machine which will perform substantially automatically one or more of the successive operations required for the bottoming of a shoe. A related object of the invention is to provide a machine by the use of which commercially satisfactory shoes may be produced in comparatively large quantities at a relatively low cost. The use of such a machine is particularly advantageous where it is desired to secure shoes of uniform quality and where large lots of shoes of the same style and size can be manufactured at one time and, moreover, highly skilled workmen, such as have heretofore been employed for performing these bottoming operations, will no longer be necessary.

The invention will be described with specific reference to the manufacture of a welt shoe and to those particular operations performed upon the shoe after the attachment of the welt and before the stitching of the outsole thereto, but it will be obvious that the invention in its broader aspects is not so limited.

According to prevailing methods, this group of bottoming operations requires considerable manipulation of the shoe on the part of the workmen even if available machines are used as far as possible. One of these operations is the trimming of the inseam which is still performed to some extent by hand but which, even when performed by machine, requires a fairly highly paid operator. Another operation is the beating or flattening of the welt. In the operation of an inseam trimming machine of any commercial type, and also of a welt beating machine, the operators both support and guide the shoe to a considerable extent by their hands and therefore each machine requires the constant attendance and attention of an operator. Moreover, in actual factory practice, other operations in the group mentioned, including the application of cement to the bottom filler and the locating of the outsole upon the shoe bottom are usually performed by hand.

A characteristic of the machine of the present invention, in its preferred embodiment, is that all of these several operations are performed automatically and in a single machine. Indeed, in the machine herein illustrated by way of example, an attendant simply places and adjusts the shoe in the machine, starts the machine into operation, and finally removes the shoe after various bottoming operations have been automatically performed.

Accordingly, one feature of the present invention comprises the combination of a plurality of mechanisms for performing operations successively upon a shoe carried by a suitable support and automatic mechanism constructed and arranged for bringing the support and said separate mechanisms into predetermined relation and for causing the latter to travel successively around the forepart of a shoe.

Another feature of the machine, as it will preferably be constructed, is that a number of lasted shoes are simultaneously operated upon and, therefore, in one aspect the invention comprises intermittently acting mechanism for bringing into predetermined relation a plurality of movable shoe supports and a plurality of mechanisms for successively performing bottoming operations upon lasted shoes before the heels are attached and cooperating power actuated mechanism for causing the bottoming mechanisms to operate simultaneously on different shoes while said supports are stationary. Preferably the machine is constructed to operate on one or more mated pairs of shoes at one time.

Moreover, another feature of the invention comprises automatic mechanism for depositing a shoe part on a lasted shoe carried by a suitable support in combination with automatic mechanism synchronized with the depositing mechanism for bringing the shoe support and the depositing mechanism into proper operative relation.

Furthermore, in addition to the features already specifically indicated, the present invention comprises also various other combinations and arrangements of parts as well as certain particular features of construction and methods of operation which will now be described in detail in connection with the accompanying drawings, and then defined in the appended claims.

In the drawings which illustrate a machine embodying the entire invention in one specific form,—

Fig. 1 is a front elevation of the machine but partly in section with certain parts, which would hide others, omitted for the sake of clearness;

Fig. 2 is a detail view mostly in side elevation, as indicated by the arrow II in Fig. 1, of a portion of the driving mechanism;

Fig. 3 is a plan view of a part of the mechanism shown in Fig. 2;

Fig. 4 is a sectional plan of the machine on the line IV—IV of Fig. 1 and particularly of the turret but with some details omitted for the sake of clearness;

Fig. 5 is a vertical section through the column of the machine showing particularly the treadle mechanism for clamping the jacks in shoe holding position, the lower portion of one of the jacks with its support being shown somewhat foreshortened in order to economize space on the drawing;

Fig. 6 is an end elevation of one of the turret arms and its jack with the means for automatically unclamping the jack;

Fig. 7 is a sectional plan of a portion of the turret driving mechanism;

Fig. 9 is a view mostly in side elevation of the inseam trimming mechanism;

Fig. 10 is a sectional plan on the line X—X, Fig. 9, of part of the same mechanism;

Fig. 11 is a side elevation upon an enlarged scale of the principal parts of this mechanism;

Fig. 12 is a sectional elevation of the same parts taken in a direction at right angles to that of Fig. 11;

Fig. 13 is a side elevation of the welt beating mechanism;

Fig. 14 is a sectional elevation of a portion of the guiding means for that mechanism;

Fig. 15 is a side elevation of the sole depositing mechanism;

Fig. 16 is a side elevation partly in section, as indicated by the arrow XVI in Fig. 1; of the multiple valve or air controller; and Fig. 17 is a sectional elevation on the line XVII—XVII, Fig. 16.

Figure 8:
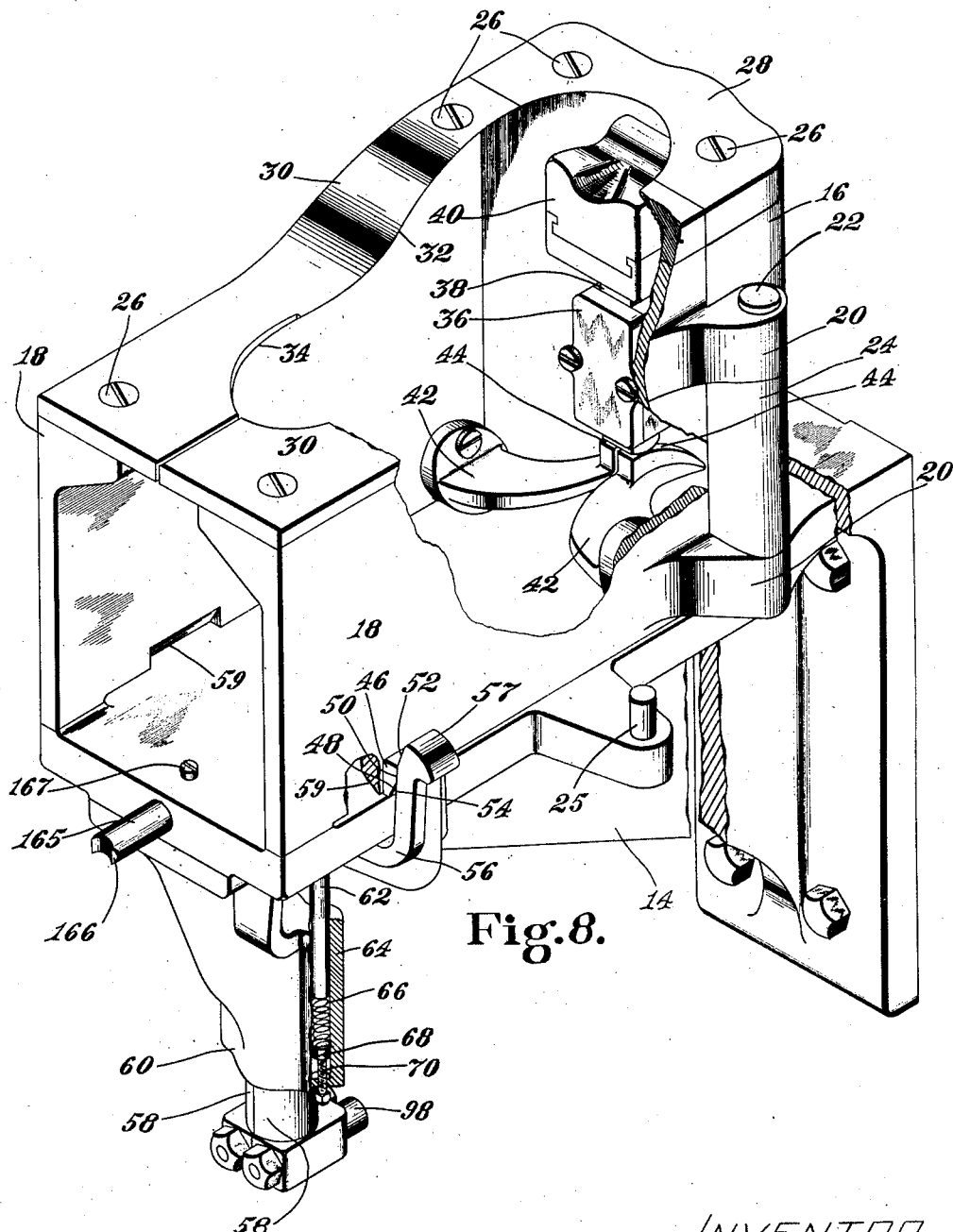
Fig. 8 is a perspective view of one of the jacks.

The specific machine illustrated has been designed particularly for use in bottoming welt shoes and comprises generally a central turret provided with eight arms each carrying a shoe support or jack. This turret is rotated automatically step by step to present a shoe carried by each jack successively to different mechanisms for performing certain bottoming operations upon the shoe. These mechanisms are all actuated and controlled automatically to perform their functions at the proper location upon the shoe and in correct time relation with each other and with the turret rotating mechanism. As shown particularly in Fig. 4, there are eight stations designated by letters, A, B, C, etc. at six of which bottoming operations are performed while at two others shoes are placed or adjusted in, and removed from, their jacks. At station A, an attendant insures that a shoe is properly located in its jack and then actuates the mechanism for clamping it therein. At station B is located the mechanism for trimming the inseam, shown specifically in Figs. 9 to 12, inclusive. At station C, a sheet filler is automatically transferred from a stack or holder into proper position upon the shoe bottom, as illustrated particularly at the right of Fig. 1. At station D, the welt beating operation is performed by mechanism shown in Figs. 13 and 14. At station E, an outsole is transferred from a stack into proper position upon a shoe bottom by mechanism shown particularly in Fig. 15. At each of the stations F and G the outsole is pressed firmly upon the shoe bottom and against the welt by mechanism shown particularly at the left in Fig. 1. Finally, as the jack approaches station H, the shoe is automatically released from its jack and an attendant removes the shoe. Preferably, both the fillers and the outsoles are brought to the machine already "molded."

As indicated in Fig. 4, it is contemplated that alternate jacks will carry respectively right and left shoes. If the type of shoe is one in which a shank stiffener is employed it may be attached either to the sheet filler or to the outsole before the filler or outsoles are stacked.

Referring now to the illustrated construction in detail, the frame of the machine includes a base 2 and a central column 4, an upper section 6 of which extends substantially to the top of the machine where it, with posts such as 7, supports a heavy cross frame 8. The lower end of the section 6 is flanged at 9 and this flange supports a large gear 10. Above this gear is the hub 12 of the turret to which are clamped eight brackets 14 which carry the eight jacks, four for right shoes and four for left.

One of the jacks is shown upon a large scale in Fig. 8 and comprises a fixed toe post 16, firmly secured to a bracket 14, and two movable sides or doors 18, each provided with two ears 20 and pivotally connected by a pin 22 to a lug 24 projecting laterally from the toe post 16. The outward or opening movement of each side 18 is limited by a fixed stop 25. Secured by screws 26 respectively to the toe post 16 and to the sides 18 are a sectional plate or plates 28 and 30, the inner edges of which form a continuous thin or knife edge 32 having substantially the outline of a welt shoe at the bottom of the crease between the welt and the upper around the forepart and shank. The term "welt crease" is intended to include the crease not only of a welt shoe but also the corresponding crease in other types of shoes. This edge may be cut back somewhat around the heel portion of the shoe as shown at 34. Through a guide 36 on the toe post 16 extends a vertically movable slide 38 carrying a rubber or other suitable pad 40 directly to sustain the toe portion of the shoe. Secured to each of the sides 18 of the jack is an arm 42 the inner end of which carries a wedge 44 so located as to engage the lower end of the slide 38 as the sides 18 are swung toward each other. By means of this construction, after a shoe has been placed in inverted position in the jack with the edge of plate 28 within the welt crease at the toe, the pad 40 is raised to clamp the shoe at the same time that the sides 18 are brought together and the edges of plates 30 are inserted into the welt crease at the sides of the shoe. With this method of supporting the work, although the plates 28, 30 will be changed for different sizes and styles of shoes yet the portions of different shoes to be operated upon will stand at substantially the same height in the machine, the thickness of the plates being varied slightly if necessary to secure that result, so that no adjustment of the height of the bottoming mechanisms is required for different shoes.

For clamping the shoe firmly in position in the jack, with its welt resting upon the plates 28 and 30, each side 18 is provided with a projection 46 having a beveled surface 48 merging into a vertical surface 50, which surfaces respectively engage a beveled surface 52 and a vertical surface 54 upon a yoke arm 56. The upper end of each arm opposite the bevel 52 is likewise beveled at 57 for engagement with the bevels 59 at the bottom edges of the sides 18 as they are swung inward. Each yoke arm 56 has a vertical spindle 58 semi-cylindrical in shape and the two spindles 58 are slidable independently in a bearing 60 clamped to the outer end of a bracket 14. Extending downward also from each yoke arm is a pin 62 sliding in a socket 64 and engaging at its lower end a coiled compression spring 66 which, in turn, rests upon a washer 68 the vertical position of which may be adjusted by a screw 70 to vary the initial compression of spring 66. The adjustment may conveniently be such that the spring maintains the beveled surfaces 52 on the yoke arms normally at about the height of the beveled surfaces 48 on the sides of the jack.

For lifting the yoke arms 56 and thereby clamping the shoe at station A, treadle mechanism, shown in Fig. 5, is provided. Vertically movable in a post 80 is a slide 82 provided with a head 84 which, when the turret comes to rest, lies immediately below the spindles 58 of one of the jacks. One edge of the slide 82 is formed as a rack to engage a pinion 86 which likewise engages a rack formed on the edge of another slide 88 connected to a treadle 90. A spring 92 tends to move the slide 82 to its lowermost position, maintaining the treadle 90 in raised position.

In the preferred operation of the machine, as hereinafter more fully described, a shoe will have been placed within the jack in approximately correct position and the sides 18 of the jack will have been partially closed when that jack arrives at station A. The attendant there, having located the shoe carefully with the edge 32 within the welt crease, will bring the sides 18 into such position that the beveled surfaces 48 thereon will be in engagement with or just above the corresponding beveled surfaces 52 upon the yoke arms. The attendant will then depress the treadle 90, causing the yoke arms to be raised and the beveled surfaces 52 to move across and above the co-operating surfaces 48, thus bringing the co-operating vertical surfaces 50, 54 into locking engagement. The yoke is retained in jack clamping position in any suitable manner as, for example, by reason of the friction produced between the surfaces 50 and 54 due to the elasticity or spring in the yoke arms 56 and in the connections between them and the last upon which the shoe is clamped. A post 94 (Fig. 6) at station H carries an inclined track 96 so located that, as a jack approaches station H, two rolls 98 on spindles 58 come into engagement with the lower edge of the track and the continued rotation of the turret causes the rolls to travel down the track, thus depressing the yoke 56 so that it clears the lower edges of the sides 18 of the jack which may then be swung apart to release the shoe as shown in Fig. 4.

Referring now to the mechanism shown, by way of example, for driving the turret and the various other mechanisms of the machine, an electric motor 100 (Fig. 1) is mounted within the column 4 and is directly connected to a short shaft 102 provided with a worm 104 which engages a worm wheel 106 (Fig. 2) on a vertical shaft 108 supported in a bracket 110 carried by the column 4. Secured to the upper end of shaft 108 is a disk 112 supporting a pinion 114 which is normally loose upon an extension of the shaft 108 projecting above the disk 112 and which meshes with the turret gear 10. This disk is provided eccentrically with a hole 116 into which may be projected a pin 118 normally depressed by a coiled spring 120 contained in a recess 121 in the pinion 114. The upper end of the pin 118 has a lateral extension 122 (see also Fig. 3) between which and the face of the pinion may be interposed a wedge 124 secured to a rock shaft 126 also mounted in a bearing of bracket 110. The lower end of this shaft carries a segment gear 128 meshing with a similar gear 130 upon a bell crank lever 132. A tension spring 134 tends to turn the lever 132 and the wedge 124 into such position that the leading end of the wedge will be above the face of pinion 114 and located to enter between it and the extension 122 so that, by the continued rotation of the pinion, the pin 118 will be withdrawn from the hole 116 and the driving connection will be broken between the motor 100 and the pinion 114. Suitable stops 136 and 138 upon the wedge 124 and the bracket 110 respectively insure that the wedge 124, when swung by spring 134, shall occupy the proper position to lift pin 118.

For swinging the wedge 124 from beneath extension 122 to permit pin 118 to enter hole 116 and thus effect an operative driving connection between the motor 100 and the turret gear 10, lever 132 is provided with a pin 140 which may be engaged by the hooked end 142 of a bar 144 pivotally connected at its lower end to a treadle 145 (Fig. 1). The bar is guided by the slotted end of a bracket 146, a spring 148 tending normally to raise bar 144 and also to maintain one edge of it, which has a projecting cam 150, in engagement with a pin 152 in bracket 146.

Assuming that the turret gear 10 is at rest with the mechanism just described in the position shown in Fig. 2 and with the treadle 145 raised, the attendant by depressing the treadle swings the wedge 124 laterally from beneath the extension 122 whereupon pin 118 enters hole 116 and forms an operative driving connection between the motor 100 and the turret gear 10. The action of cam 150 against pin 152 causes hook 142 to slip from pin 140 after the wedge 124 has released pin 118 so that spring 134 swings the wedge back against the end of extension 122. Then, after pinion 114 has partially rotated from the position shown in Fig. 3, stop 136 is brought into contact with stop 138 and the wedge occupies the position shown in Fig. 3 where it will disconnect the pinion 114 from disk 112 as described after one rotation of shaft 108 has been completed which corresponds to a rotation of the turret gear 10 through one quarter of a revolution.

The driving connection between gear 10 and the hub 12 of the turret is shown in detail in Fig. 7 and comprises a stud 154 to which is pivoted a pawl 156 the operative end of which is normally pressed by a spring 158 into engagement with the cylindrical surface of the turret 12. This surface, however, is provided with a series of recesses 160 with which the pawl 156 may engage. The pawl is rocked to withdraw its end from the recess 160 with which it may be engaged at the time, during the rotation of the gear 10 when the tail end of the pawl engages any one of four cam surfaces 162 on a ring 163 loosely resting upon the face of the gear 10 but held in position laterally by tie rods 164 extending to any suitable part of the frame. With this construction, only a portion of the movement of gear 10 is transmitted to the turret 12. When the connection is made, as indicated in Fig. 7, between the motor 100 and gear 10 by the treadle operated mechanism shown in Fig. 2, gear 10 is positively connected through pawl 156 with the turret 12 and the turret is given one eighth of one complete rotation whereupon one of the cams 162, acting upon pawl 156, breaks the driving connection between gear 10 and the turret, leaving the turret at rest while the gear continues to rotate until wedge 124 disconnects it from its driving pinion 114, as already described. This further movement of the gear 10 is utilized to operate certain mechanisms while the turret is at rest, as will shortly be explained. If it is desired, however, to impart to the turret an intermittent movement with substantially equal predetermined periods of rest and motion, the attendant may remove pin 150 or otherwise lock wedge 124 out of the path of extension 122 so that the gear 10 is rotated continuously and the locking pin 118 will remain operative so long as the treadle 145 is depressed. Nevertheless, even then if a longer period of rest is required, the attendant releases the treadle permitting the wedge 124 to withdraw pin 118 and disconnect the turret from its motor.

It is contemplated that any suitable supplemental locating means may be provided for insuring that the turret shall stop at precisely the correct position for the operation of the various mechanisms upon the shoe. By way of example, a spring-pressed pin 165 is shown as extending outward from the base of each jack (see Figs. 8 and 15), the latch being beveled at 166 on its leading side and being retained in the jack by the end of a screw 167. The end of the pin 165 is mounted to fit a fixed stop which, for convenience, is indicated as the hollow shaft 168 which forms a part of the sole transferring mechanism.

As illustrated, compressed air is utilized to operate several of the mechanisms of the machine. The compression is effected by a pump 170, connected to the motor 100 as shown in Fig. 1, which compresses the air into a storage tank 172 connected to the various air operated mechanisms, through a pipe 174 and a controller in the form of a multiple valve, designated as a whole in Fig. 1 by the reference character 176 and supported in a bracket 177 projecting from column 4. The different ports of the valve are connected to the various mechanisms so that the timing of their action is determined by the location of the ports and by the rotation of the controller 176 as will be further explained in connection with Figs. 16 and 17. The controller is given one complete rotation for each quarter rotation of the gear 10 through connections which comprise a beveled gear 178 meshing with a similar gear 180 at the lower end of a shaft 182 which shaft at its upper end carries a pinion 184 of one fourth the diameter of gear 10 with which it meshes.

A spiral gear 186 secured also to shaft 182 meshes with a similar gear 188 on the end of a shaft 190 which is connected to the sole depositing mechanism shown in Fig. 15 and to be described in due course.

The first mechanism which operates upon the shoe after it has been jacked is the inseam trimming mechanism located at station B and shown in Figs. 9–12. In Figs. 9 and 12, the welt of the shoe to be trimmed is designated 200, the inseam material to be trimmed away, 202, and the insole, 204. A cup shaped trimming knife 206, which may be of usual construction, is removably clamped to a short shaft 208 mounted in a knife block 210 from which extends an arm 212 carrying a boss 214 at its outer end and slidable over a stud 216 which is secured in a short arm 218 pivoted upon a pin 220 at the lower end of an arm 222. At its inner end the shaft 220 is extended beyond arm 218 (Fig. 12) so as to project over the edge of the jack and it carries a roll 224 which travels along the jack plates 28, 30. Projecting inward from arm 218 is another arm 226 which carries a roll 228 which also travels along the upper surfaces of plates 28, 30, the roll 228 being located somewhat in advance of the roll 224, as shown particularly in Fig. 11, and serving to tilt the knife 206 about the shaft 220, in order to maintain the axis of the knife approximately parallel to the portion of the inseam being trimmed. The block 210 which directly carries the knife is slidably connected through a dove-tail 232 with a second block 234 which, at its upper end, carries a series of guide rolls 236 engaging segmental guiding surfaces 238 at the lower end of a vertical sleeve 240 which is integral with the arm 222.

Provision is made for adjusting the cutting edge of the knife 206 in the direction of its axis to maintain the edge in the axis of sleeve 240, thus compensating for the wearing away of the knife as it is ground. The adjusting devices comprise a lug 242 upon the block 210 into which is threaded a screw rod 244 which in turn is rotatable, but confined against longitudinal movement, in a lug 246 projecting from the upper block 234. The rod 244 may be turned to move block 210 forward relative to block 234 and also relative to arm 218 so as to shift the knife 206 forward, or to the left as shown in Fig. 11. A spring 248 connecting arms 218 and 222 holds the forward roll 228 firmly against the top plate of the jack and consequently the axis of the knife is kept approximately parallel to the portion of the inseam being trimmed.

The sleeve 240 is rotatable and longitudinally slidable in a bearing 252 (Fig. 9) at the end of an arm 254 projecting from a table 256 carried at the upper end of a rod 257 which is vertically movable through a slide 258 which, in turn, is reciprocable horizontally upon ways 259 in a stationary post 260 forming part of the frame of the machine. The rod 257 carries a roll 262 at its lower end which travels along a fixed cam surface 264 which in vertical contour corresponds in a general way to the upper surface of the jack and, therefore, to the portion of the shoe to be operated upon. During the reciprocation of slide 258, rod 257 and the parts carried thereby, as will further be described, the roll 262 travels over the cam 264, thus changing the vertical position of the arm 254 approximately according to the spring or longitudinal vertical curvature of the shoe. However, since it is contemplated that the same cam 264 will be used for a number of different sizes and styles of shoes, the precise vertical position of the knife 206 is determined by the engagement of roll 224 with the upper surface of the jack, provision being made for a limited vertical movement of the sleeve 240 within the bearing 252.

The knife 206 is rotated at high speed by mechanical connections from an electric motor 266 at the opposite end of the table 256 from the arm 254 and the parts supported thereby. This motor, therefore, substantially counter-balances the weight of the parts carried by the arm so that there is relatively little tendency of the rod 257 to bind in its long bearing carried by slide 258. The motor 266 is coupled to a shaft 268 carrying a spiral gear 270 meshing with a similar gear 272 on a short shaft 274 which carries a worm 276 hereinafter mentioned. Gear 272 also meshes with a gear 278 at the rear end of a shaft 280 extending through arm 254 and carrying a beveled gear 282 at its forward end. As shown in Fig. 11, gear 282 drives a similar gear 284 upon a short vertical shaft 286 to which is secured a pinion 288 driving a circular rack or large gear 290. The bevel gear 292 secured to the rack 290 drives a bevel pinion 294 upon a horizontal shaft 296 (Fig. 12) supported in the sleeve 240 and having secured thereto a spiral gear 298 meshing with a similar gear 300 upon a shaft 302 which is supported in a bracket 304 mounted to rock upon shaft 296. The lower end of shaft 302 is supported by a bracket 306 mounted to rock about shaft 308 having bearings in block 210. A gear 310 secured to shaft 302 drives a gear 312, fixed to the shaft 308, which, in turn, drives a gear 314 secured to the knife shaft 208. By means of the connections just described, the knife is driven positively from motor 266 notwithstanding the vertical, tilting and horizontal rocking movements which are imparted to both the knife and knife carrier.

The mechanism by which the rocking movement of the knife carrier is secured includes a spindle 320, (Fig. 12), fixed to the upper end of sleeve 240, upon which is loosely mounted a disk 322 to which is secured a bevel gear 324. This gear is rotated by a pinion 326 (Fig. 9) at the forward end of the shaft 328 extending through arm 254 and carrying a worm wheel 330 at its rear end which meshes with the worm 276 on shaft 272. A relatively wide faced pinion 332 is mounted to rotate with a hub 333 forming a part of the disk 322 and meshes with a normally stationary rack 334 which, as shown particularly in Fig. 10, has approximately the shape of the forepart of a shoe and particularly of the inseam to be trimmed. The rack is secured to a reversible block 336 which also carries at its opposite side a similar rack 338 except that the rack 334 is used when an inseam for a right shoe is to be trimmed while the rack 338 is automatically brought into operative position when the inseam of a left shoe is to be trimmed. The reversible block 336 is supported upon a rod 340 which at one end, as shown in Fig. 9 extends into a socket formed in the end of a shaft 342 which is rotatably mounted in a bracket 344 extending from the upper end of the post 260. The rod is removably held in shaft 342 by suitable means such as a cotter pin 346. The portion of the rod 340 which extends through the block 336 and into the shaft 342 is preferably square in section so that the block will be rotated when the shaft 342 is rotated.

At the rear of the reversible block 336 is a stationary block 348 carried between the sides 350 of the post 260. Within this block is a rack 352 which forms a continuation of the rack 334 or, when the block 336 is reversed, a continuation of the rack 338. Within the block 336 is formed an outer guide surface 354 which is continued as surface 356 in the stationary block 348. The corresponding inner guide surface 358 in the block 336 is continued as surface 360 in the stationary block. A thin roll or disk 362 rotatable on shaft 320 bears against the inner guide surfaces 358 and 360 and prevents the teeth of pinion 332 from touching those surfaces. An arm 364 fixed to shaft 320 carries a guide roll 366 constructed and arranged to engage the outer guide surfaces 354, 356 and also the inner guide surfaces 358, 360.

When the motor 266 is put into operation, it not only rotates the trimming knife 206 at a rapid rate but it also rotates the pinion 332 slowly which is thus caused to travel along racks 334, 352 so that the trimming mechanism travels progressively along the inseam. During this travel, the knife and the mechanism which carries it are turned about the axis of sleeve 240 and shaft 320 by the engagement of guide roll 366 with its co-operating guiding surfaces. When the motor is thrown out of operation, as will later be described, the pinion 332 and guide roll 366 are located within the stationary block 348 with the knife 206 in some such position as is indicated by dotted lines in Fig. 9. While these parts are in this position, the block 336 is automatically reversed, during the rotation of the turret, through the action of gear 370 fixed to the end of shaft 342 and meshing with a gear 372 at the upper end of the central column extension 6 (Fig. 1). A ring 373 secured to the extension just below the gear has an upwardly extending shoulder or rib 374 extending into a corresponding recess in the lower face of the gear. A retaining plate 375 also secured to extension 6 aids in holding gear 372 in place. This gear is provided with internal teeth 376 (Fig. 1) meshing with a pinion 378 at the upper end of a shaft 380 which, at its lower end, carries a pinion 382 meshing with an internal gear 384 formed at the upper end of the hub 12 of the turret. Accordingly, during the intermittent rotation of the turret, the rack 334 for operating upon right shoes and the rack 338 for operating upon left shoes are alternately moved into operative position to be engaged by gear 332 while the inseam trimming operation is being performed.

The machine illustrated is provided with a novel type of mechanism for removing waste material trimmed from the inseam. As shown particularly in Fig. 11, the upper knife block 234 is provided with a lug 386 to which is clamped a hood 388, the opening in which is close to the cutting edge of the trimming knife 206. The hood 388 carries an exhaust pipe 390 which presents an opening 392 the axis of which is transverse to the longitudinal axis of the shoe. A pipe 394 (Fig. 9), which is shown as stationary but which may be movable, is connected to a fan or other air exhausting or suction means and is so arranged that when the motor 266 stops and the inseam trimming mechanism is in the position indicated by dotted lines, the opening 392 comes into registration, or operative relation, with the pipe 394. Therefore, much of the waste material which has accumulated within the cup shaped knife 206 and within the hood 388 during the trimming of a shoe will be sucked out through pipes 390 and 394 after each cycle of operation of the trimming mechanism. The controller 176 or any other suitable means may be employed to control the operation of the fan or it may be allowed to run continuously.

After the inseam trimming operation has been performed at station B, the turret of the machine is automatically moved, as already indicated, to bring the shoe to station C where a sheet filler, with which a shank stiffener will usually be incorporated, is deposited in correct position within the insole rib of the shoe. The filler depositing mechanism is shown chiefly at the right of Figures 1 and 4 where the pieces of sheet filler are designated 400. It is contemplated that the machine will carry at all times two holders 402 filled with stacks of fillers, one containing fillers for right shoes and the other fillers for left shoes. These holders 402 will be presented alternately in position to deliver filler pieces to the mechanism which transfers them to the shoe. The holders are supported directly upon a slide 406 which is movable transversely in a fixed frame 408 having guideways 410 for the slide. Through an opening in the frame 408 moves the head 412 of the stack lifting mechanism which is supported in a column 414 projecting from the base 2 of the machine. The head 412 is held against rotation by rods 416 secured to it and projecting through openings in the head of the column. Downward from the head 412 extends a sleeve 418 which is slidable on a piston rod 420 connected to a piston 422 which slides in a stationary cylinder 424 in the column 414. Air may be admitted at the lower end of the cylinder below the piston through a pipe 426 connected to one of the ports of the air controller 176 previously referred to. While the piston might be rigidly connected to the head 412, yet in the illustrated construction, a spring 428, which is located between the piston 422 and the end of sleeve 418 is strong enough to hold a relief valve 430 at the end of the piston rod against its seat 432 near the upper end of the sleeve even when the piston is moved upward to lift the stack of fillers. When, however, the further upward movement of the stack is prevented, as will be described, the air pressure may be sufficient to cause the spring to yield and the valve 430 to move away from its seat so that the air below the piston may escape through a passage 434 in the piston rod, through a transverse passage 436 and holes 438 in the sleeve 418 and a hole 440 in the cylinder 424 into the atmosphere.

The mechanism for moving the two stacks alternately into operative position is shown chiefly in Fig. 4 and comprises a piston 442 connected to the slide 406 and moving in a cylinder 444 supported by the frame of the machine. A spring 446 connected to the slide and to a fixed part of the machine tends to shift the slide so that the piston comes into engagement with the end of cylinder 444 and thus the stack which is shown lowermost in Fig. 4 is shifted to a position immediately above the head 412 of the stack lifting mechanism. Air is admitted to the cylinder 444 to shift the slide into engagement with an abutment 448, i. e., to the position shown in Fig. 4, through pipes 450, 452 which extend to the compressed air tank 172 by way of a rotary conical valve 454 (Fig. 1) supported in a seat 456 carried by a bracket 458 extending from the column 414. A spring 460 tends to hold the valve firmly to its seat. By a movement of the valve through a quarter turn, communication from tank 172 to the cylinder 444, is shut off and the air in the cylinder and connecting pipes is allowed to escape. This movement of the valve is effected through the action of parts, controlled from the turret, including pins 462 which project downward from alternate arms of the turret as, for example, from each arm which carries a right jack. Each of these pins is so located that during the rotation of the turret it engages the offset end 464 of the stem of the valve, throwing the valve into position to connect the tank 172 with the cylinder 444 as shown in Figs. 1 and 4. When, however, upon the next turning movement of the turret the pin 462, then in engagement with the stem 464, is carried away therefrom, a spring 466 turns the valve through a quarter turn, causing a stop 468 upon the lower end of the stem to come into engagement with a fixed stop 470 upon the bracket 458, and causing the main passage 472 through the valve to register with an exhaust port 474 in the valve seat which opens to the atmosphere while a cross passage 476 in the valve registers with the pipe 452 extending back to cylinder 444 and at the same time the side of the valve opposite passage 476 closes the passage to the tank 172. Hence, spring 446 then shifts slide 406 and piston 442 moves slowly to the closed end of cylinder 444.

The mechanism for transferring the fillers one by one from the stacks to the shoe is also shown in Fig. 1 and comprises a carrier 486 having two or more spurs 488 projecting from its lower face which face has substantially the same vertical contour as the fillers, but preferably has a somewhat smaller area. This carrier is pivoted at 489 to a slide 490 which constitutes an air "cylinder" sliding upon a track 492 supported at its ends by brackets 494, 496 extending respectively from the central column extension 6 and from the post 414. Within the cylinder 490 is a stationary piston 498 at the end of a hollow piston rod 500 also supported by bracket 494. The central passage through the piston rod communicates by means of piping 502 with the air controller 176, a spring 504 connecting bracket 494 with the cylinder 490 and acting, when permitted to do so by the escape of the air, to draw the cylinder 490 and carrier 486 toward the axis of the machine, as shown in Fig. 1, to place the filler piece in its proper position upon the bottom of the shoe, preferably so as substantially to fit the ribs of the insole. The carrier 486 is returned to the position represented in dotted lines in Fig. 1 by the action of compressed air admitted to cylinder 490 through the operation of the air controller 176.

Means may be provided by which a coating of cement or suitable adhesive is applied to the central portion of the bottom of the insole just before the filler is deposited thereon and also to the filler after it has been thus deposited. By way of example, this means is illustrated as comprising a brush 506 at the lower end of an arm 508 having a central passage 510 communicating with a pipe 512 which is rigid with the arm 508 and constitutes both a pivot for the arm and also a valve by which communication is established between the passage 510 and a passage 514 in the cross frame 8 which passage is connected by a pipe 516 to the bottom of a tank 518 containing cement 520. The upper portion of the tank is connected by a pipe 522 to the compressed air tank 172. A spring 524 connected with the cross frame 8 and with an arm 526 projecting from the arm 508 tends constantly to hold the latter against a roll 528 mounted on the sliding cylinder 490. The valve at the pivot 512 is so located with relation to the passage 514 that communication is momentarily established with the tank 518 at about the time that the brush reaches the ball line of the shoe so that a small quantity of cement is deposited on the insole and then just before the brush reaches the position shown in Fig. 1 communication is shut off and the filler is then deposited. Similarly cement is deposited on the filler during the return movement of the brush. The inclination of the spurs 488 and the nature of the filler are such that when the stack of fillers is pressed against the carrier 486 and is then retracted respectively through the admission of air to and its escape from the cylinder 424, the topmost filler will remain suspended from the spurs but, when it is subsequently pressed down and held for a moment upon the insole upon which cement has been deposited, the adhesiveness of the cement will be sufficient to cause the filler to detach itself from the carrier 486 when the latter is returned to its receiving position, as shown in dotted lines in Fig. 1.

The next operation performed upon the shoe is the beating of the welt at station D by mechanism shown in Figs. 13 and 14 wherein the hammer or tool for engaging the welt is designated 540. It is contemplated that the lower operative face of the tool will be a surface of revolution so that its action will be the same in whatever angular position about its vertical axis it may assume relative to the work. However, a tool of some other shape may be employed in which case means, such as is shown in Figs. 9 and 10 will be provided for turning the tool about its vertical axis as it travels about a shoe.

As shown by way of example in Fig. 13, the hammer 540 slides vertically over a rod 542 fixed at the outer end of an arm 544 projecting from a plate 546 from which downwardly extends a rod 548 passing through a long bearing on a slide 550 which is movable horizontally in guideways 552 on a post 554 forming part of the main frame. It will be observed that the parts just described, as well as many of the other parts shown in Fig. 13, and about to be described further, correspond closely to parts already referred to in describing the inseam trimming mechanism. Thus, the rod 548 carries at its lower end a roll 556 which travels over a fixed cam 558 having the general vertical contour of the portion of the shoe to be operated upon.

The hammer 540 is vibrated by an electric motor 560 upon the table 546 coupled to a shaft 562 which, at its forward end, is provided with a crank disk 564 actuating a connecting rod 566 pivoted to a lever 568 which, in turn, is fulcrumed at 570 in the arm 544. A second lever 572 is pivoted at 574 to the lever 568, a compression spring 576 being interposed between the outer end of lever 568 and a portion of lever 572 and a pin 578 in ears 579 limiting the movement of lever 572 about its pivot under the influence of spring 576. The outer end of lever 572 is bifurcated and connected by pins 580 with a groove in the hammer 540. With this construction, the hammer will deliver a rapid series of yielding blows to work presented thereto when the motor 560 is running.

As already indicated, the mechanism for causing the hammer to travel around the welt is similar to that shown in Figs. 9 and 10 and includes a bevel gear 581 (Fig. 14) supported upon the rod 542 to rotate freely thereon but secured to a pinion 582 meshing with either of two racks 583, 584. Carried upon the eccentric upper end of rod 542 is a roll 585 which runs against a cam surface 586 in a reversible block 588 corresponding to the block 336 already described. The block 588 is supported and rotatable by a square rod 590 removably connected to a shaft 592 which is supported in a bearing in a bracket 594 at the upper end of the post 554. At that end of the reversible block 588 corresponding to the heel portion of the shoe is a stationary block 596 similar to the block 348 already described.

For driving pinion 582, which is maintained in mesh with its rack 583 or 584 through the engagement of roll 585 with guide surface 586, and for thereby causing the welt beating tool to operate on the welt progressively around the shoe, a spiral gear 598 on shaft 562 meshes with a similar gear 599 on a short shaft 600 fixed to which is a worm 601 meshing with a worm wheel 602 upon a shaft 604 which extends through the arm 544 and carries at its forward end a bevel pinion 606 which meshes with the bevel gear 581 already described. Block 588 is reversed by pinion 608 meshing with gear 372 in the manner already described.

After the beating of the welt has been effected, the turret is automatically turned to carry the shoe to station E where an outsole is deposited. The outsoles, indicated by the numeral 610 in Figs. 4 and 15, are carried in two stacks, respectively, for right and left soles which are alternately brought into alinement with the sole transferring device by mechanism substantially the same as that employed for shifting the fillers which has already been described. Likewise, that stack of soles from which the next sole is to be removed is raised to deliver the topmost sole to the transferrer by mechanism of substantially the same construction as that employed for raising the stacks of fillers as already described. Therefore, certain of the more important parts of this mechanism for moving the stacks of soles are indicated by the same reference characters in Figs. 4 and 15 as the corresponding parts in the filler mechanism. In fact, as illustrated in Figs. 1 and 4, the same valve 454 which controls the shifting of the filler stacks laterally also similarly controls the shifting of the sole stacks.

The topmost sole 610 from the raised stack is pressed against suction cups 620 (Fig. 15) supported upon a swinging arm or transferrer 622 which is carried at the upper end of the pipe 168 movable in bearings 624 in a bracket or column 626 forming a part of the frame of the machine. The lower end of pipe 168 is suitably connected with a flexible tube 632 extending to the air controller 176. The transferrer is movable both vertically and rotatably. The mechanism for effecting the vertical movement includes a collar 633 fixed to the pipe 168 and actuated by a bell crank lever 634 pivoted in bracket 626 and carrying a roll 635 running in a cam track 636 in a cam block 638 secured to a shaft 640 supported by the bracket 626. A bevel gear 642 fixed to the block is driven by a similar gear 644 on a shaft 646 also carried by an extension of the bracket 626 and connected by a flexible joint 648 to the shaft 190 already referred to. For imparting substantially a half rotation to the transferrer 622, a pinion 650 is secured to the pipe 168 and meshes with a rack 652 sliding in bracket 626 and actuated by a bell crank lever 654 carrying a cam roll 655 running in a track 656 in the cam block 638.

As indicated diagrammatically in Fig. 4, a pad which is kept supplied with adhesive is located at station E. After the stack of soles from which the next sole is to be removed has been pressed against the suction cups 620 of the transferrer 622, when it occupies a position immediately over the stack, the suction is applied through pipes 632 and 168 to the cups so that as the pipe 168 is raised the topmost sole is removed from the stack. The transferrer is then turned into the position shown in Fig. 4 and the sole is lowered down upon the adhesive pad 658 receiving a coating of cement. It is then raised slightly and turned to position over the shoe, whereupon the suction is cut off, the sole is deposited on the shoe, as indicated in Fig. 15, and the transferrer is returned into normal position above the stack.

The turret is then turned another step, bringing a shoe to station F. Pressure is exerted upon the sole to "lay" it and to shape it to the bottom of the shoe and the cement is permitted to set sufficiently to hold the sole on the shoe up to the time that the sole is permanently secured to the welt by the use of another machine, commonly known as an outsole stitcher. In order to insure the proper shaping of the sole, it is contemplated that it shall be subjected to a pressing operation at station F and then, after the turret is rotated another step, that it shall be subjected again to a similar operation at station G. The mechanisms at these two stations for performing this operation are identical except that at station F certain electrical devices, to be described in connection with station G, may be omitted. For convenience, the pressing mechanism is shown at the left of Fig. 1 where station G is indicated. As shown by way of example, pressure is exerted upon the sole by a mold or pad 660 directly connected to a piston rod 662 extending from a piston 664 movable in a cylinder 666 formed in or mounted upon the cross frame 8. A spring 668 interposed between the piston 664 and the end of the cylinder tends to hold the piston and the mold in highest position. Pins 670, are also projecting from the mold, slide in holes in the frame 8 and prevent the mold from turning. The mold is pressed down upon the sole against the resistance of spring 668 by the admission of air above the piston through a pipe 674 connected with the air controller 176.

At this station G are illustrated also the devices for controlling the operation of the electric motors 266 and 560. The main line wires, connected with a source of electrical supply, are designated 676 and 678 in Fig. 13. From these wires, the wires 679 and 680 lead to motor 560 while from them there is connection in parallel by wires 682, 684 to the motor 266 for the inseam trimming mechanism. As shown in Figs. 1 and 13, the circuit through the motors from the main line may be interrupted by means of a switch 686 interposed in the wire 680 between the main line and the connections to the two motors. As illustrated in Fig. 1, the switch is held open by one of the pins 670 when the mold 660 at station G is in retracted or raised position but the switch is closed to make electrical connection between the line and the motors just before the mold comes into operative engagement with the outsole. The motors are, therefore, maintained in operation all the time that the sole at station G is held under pressure.

As already indicated, the controller for the air supply to the various mechanisms which are operated by air may be of any known or suitable type. By way of example, a multiple valve for the purpose is illustrated in Figs. 1, 16 and 17. It comprises three similar individual rotary valves connected respectively to the supply pipes 426, 502 and 674. Fig. 17 shows in section the valve for controlling the mechanism which effects the vertical movement of the stack of fillers. Air is admitted from the storage tank 172 through pipe 174 to the central passage 700 in a hollow shaft 702 which is rotated continuously through gear 178. The valve member 704 which is secured to the shaft contains a radial passage or port 706 which, during the greater part of each rotation of the shaft, is sealed by a casing 708 which is held against rotation by a rod 709 passing through bracket 177 above mentioned. The inner periphery of this casing, however, is recessed at 711 and the pipe 426 opens into the recess so that, as the valve member 704 rotates in the direction indicated by the arrow in Fig. 17, the passage 706 opens communication from the storage tank to the interior of the cylinder 424 so that the stack of fillers is raised. As the valve member continues its rotation, the passage 706 moves past recess 711 and the supply of air to the cylinder 424 is shut off. Thereafter, another passage or port 712 in member 704 comes into communication with recess 711 and with cylinder 424 whereupon the air contained in the cylinder and in the pipe 426 exhausts through the passage 712 and another passage 714 which communicates with the atmosphere so that the stack of fillers returns to lowermost position. The valves which control the transfer of the fillers one by one from the stack to the shoe and which control the sole pressing mechanisms are shown at the middle and right of Fig. 16 and are of similar construction to that shown in Fig. 17.

Having thus described in detail the several mechanisms for performing the separate operations upon the shoe, their co-operative relation in the illustrative organized machine will now be further pointed out in a brief résumé of its operation. The machine will require at least one attendant but it is believed that it can be operated most efficiently by providing two, one, who may be practically unskilled, being located at station H and another, somewhat more skilled, being located at station A and, in addition, another general helper may, from time to time, remove empty filler and sole holders at stations C and E and replace them by holders having full stacks. The unskilled attendant will remove a shoe which has been operated upon from each unclamped jack as it comes to rest at station H and will replace it by another shoe upon which the several operations described are yet to be performed but he will simply lay the shoe in approximate position in the jack, swinging the sides 18 thereof only part way together and, preferably, with the beveled surfaces 48 in position to engage the corresponding surfaces 52 upon the yoke 56 when the latter is released by track 96 as the turret turns to take the shoe from station H to station A. As already fully explained, the turret is turned intermittently by the mechanism shown particularly in Figs. 1, 2 and 7 driven by the continuously running motor 100, being given one-eighth of a rotation at each step.

The attendant at station A will insure that the shoe is correctly placed in the jack with the edge 32 thereof in the welt crease and the welt lying evenly above and on the plates 28 and 30, whereupon he will depress the treadle 90 and raise the yoke arms 56, forcing the sides 18 together to clamp the shoe firmly. Then, if the wedge 124 has been allowed to lift pin 118 to interrupt the driving connection between pinion 114 and gear 10, the operator will depress the treadle 145 to re-establish such driving connection and the turret will be given another eighth of a rotation, bringing the shoe, which has just been clamped in the jack, to station B where the inseam trimming operation is to be performed. When the jack stops at this station, the motor 266 will be at rest and the pinion 332 will be within the stationary block 348. As soon as mold 660 is depressed by the admission of air to cylinder 666 through controller 176, motor 266 will be started into operation and knife 206 will be carried quickly around the shoe to trim the inseam. In this movement the knife will be rotated rapidly, tilted through the action of roll 228 about axis 220 and also swung about the vertical axis of sleeve 240 by the action of roll 366 in its cam track. Moreover, the correct vertical height of the knife with relation to the inseam will be approximately maintained through the co-operation of cam 264 with roll 262 and more exactly by the roll 224 traveling along the upper surface of the jack. When the motor 266 is thrown out of operation by the lifting of switch 686, the inseam trimming mechanism will come to rest in its initial position with the pipe opening 392 substantially opposite the corresponding opening in the pipe 394, for the withdrawal by the suction mechanism connected thereto of the waste materials remaining within the cup of the knife and within the hood 388.

During the next step movement of the turret, as indeed during each such movement, the reversible block 336, as well as the corresponding block 588 of the welt beating mechanism, will be turned upon its axis half a rotation to interchange the position of the racks and cam surfaces therein, which are then in operative position, with the corresponding racks and cam surfaces for the other shoe of a pair. Likewise during each step movement of the turret, the slides 406 which carry the stacks of fillers and of soles are shifted so that after alternate step movements the proper component parts for right and left shoes are presented to the transferring mechanisms which deliver them from the stacks to the shoe.

As soon as a shoe comes to rest at station C where the carrier 486 occupies the position shown in dotted lines in Fig. 1, one of the holders 402 is raised by the admission of air into cylinder 424 to press the topmost filler of its stack over the spurs 488 on the carrier. The stack immediately descends and the carrier is drawn by spring 504 toward the center of the machine as the controller 176 allows air in cylinder 490 to escape. During this movement a small quantity of cement is deposited on the forepart of the insole from brush 506 and then the filler is pressed against the insole as the cylinder 490 completes its movement to the left as shown in Fig. 1. The carrier 486 then returns to initial position, detaching itself from the filler because of the adhesiveness of the cement deposited by brush 506.

When, after the next step movement of the turret, the shoe comes to rest at station D, the pinion 582 connected with the welt beating mechanism lies in the stationary block 596. Then, after the switch 686 has closed the circuit and the motor 560 has started, the welt beating hammer is rapidly vibrated against the welt of the shoe and is carried around the welt through the engagement of pinion 582 with its rack. The motor is thrown out of operation by the opening of switch 686 when the pinion 582 has reached substantially starting position.

The rotation of the turret next brings the shoe to station E, where transfer arm 682 is located above one of the stacks of outsoles. The stack raising mechanism delivers the topmost outsole to the cups 620 and, suction being applied to these cups, the topmost sole is removed from the stack by the lifting of transferrer 622 which is then swung through a quarter turn to bring it over cement pad 658 and then depressed to coat the lower surface of the outsole with cement after which the transferrer is raised and swung another quarter turn to bring it over the shoe upon the jack at station E. The transferrer is then lowered to deposit the sole in correct position upon the shoe after which the suction is cut off and the transferrer raised and returned to position over the stack.

The next step rotation of the turret brings the shoe to station F where the sole is held against the shoe under pressure exerted through mold 660 for a considerable period of time, after which the mold is raised and the shoe carried to station G where it is again subjected to a like pressing action. This completes the operation of the machine upon the shoe. Upon the next step rotation of the turret the track 96, engaging rolls 72, unclamps the jack so that the shoe may be removed from the machine by the attendant at station H.

It is to be understood that, while in order to set forth clearly the character of the invention I have described in detail, by way of example, a particular machine embodying it, yet obviously the invention in its broader aspects as defined in the appended claims is capable of embodiment in various other specific forms of construction and, therefore, its scope is not limited except as defined by the claims or as required by the prior art.

The above-described automatic mechanisms for transferring shoe parts, such as soles and sheet fillers, from appropriate holders and assembling them in predetermined relation upon a movable support embody novel subject-matter common to this application and to applicant's co-pending application Serial No. 477,709, filed June 15, 1921, which common subject-matter is not claimed herein since it is claimed in said co-pending application.

Having thus described my invention, what I claim as new and desire to secure by Letters Patent of the United States is:

1. A shoe bottoming machine having, in combination, a shoe support, a plurality of mechanisms for operating successively on a shoe carried by said support, and automatic mechanism for bringing said support and said operating mechanisms into predetermined relation and for causing said operating mechanisms to travel successively around the forepart of the shoe.

2. A shoe bottoming machine having, in combination, a support for a lasted shoe before its heel is attached, separate mechanisms for performing bottoming operations upon the shoe, power operated means for causing said mechanisms to act progressively around the forepart of the shoe, and intermittently acting power operated mechanism constructed and arranged to move said support and present a shoe carried thereby successively to said separate mechanisms.

3. A shoe bottoming machine having, in combination, a plurality of movable shoe supports, a plurality of mechanisms for operating successively on lasted shoes carried by said supports before the heels are attached, intermittently acting mechanism for bringing said supports and said operating mechanisms respectively into predetermined relation, and cooperating power actuated mechanism for causing the latter mechanisms to operate simultaneously on different shoes while said supports are stationary.

4. A machine for use in the manufacture of shoes having, in combination, a plurality of shoe supports, power operated mechanism constructed and arranged to move said supports intermittently to and from operative position, a tool movable with relation to a shoe support, when in said operative position, in a path corresponding in contour to the forepart of a shoe, and mechanism synchronized with the movement of the supports for automatically moving the tool to maintain it in correct operative relation to the shoe.

5. A shoe bottoming machine having, in combination, a plurality of shoe supports, alternate supports being constructed and arranged to carry right and left shoes, a plurality of mechanisms for operating successively on the shoes, and automatic mechanism for relatively moving said supports and said operating mechanisms to bring them into predetermined relation and for causing the latter mechanisms to operate in complemental paths respectively upon right and left shoes.

6. A machine for assembling parts of shoes having, in combination, a plurality of movable supports for shoe parts and a pair of complemental supports for right and left shoe parts, mechanism for transferring a part from either of said complemental supports to one of the other supports, and automatic mechanism synchronized with the movement of the latter supports for presenting said complemental supports alternately to the transferring mechanism.

7. A machine for assembling parts of shoes having, in combination, a plurality of movable supports, a plurality of complemental supports, mechanism for transferring shoe parts from said complemental supports to said movable supports, and automatic mechanism synchronized with the movement of the latter supports for presenting said complemental supports successively to said transferring mechanism.

8. A machine for use in the manufacture of shoes having, in combination, an intermittently actuated carrier, a plurality of shoe supports mounted thereon, alternate supports being constructed and arranged to hold right and left shoes, a holder for right shoe parts and a separate holder for left shoe parts, and automatic mechanism for transferring the shoe parts alternately from the two holders to the shoe supports.

9. A machine for assembling parts of shoes having, in combination, a shoe support, separate mechanisms for depositing a plurality of shoe parts upon the bottom of a shoe carried by said support, and automatic mechanism for relatively moving the support and said mechanisms to present the support successively to said mechanisms for depositing a plurality of parts successively upon the shoe bottom.

10. A machine for assembling parts of shoes having, in combination, transferring mechanism, a pair of complemental supports for right and left shoe parts, a slide carrying said supports, power operated mechanism for raising either support relative to the other, and power operated mechanism for shifting the slide to present said supports alternately in operative relation both to said raising mechanism and to said transferring mechanism.

11. A machine for assembling parts of shoes having, in combination, transferring mechanism, a pair of complemental supports for right and left shoe parts, a slide for carrying said supports, power operated mechanism for raising either support relatively to the other, a movable support for another shoe part, and power operated mechanism synchronized with said movable support for raising either of the complemental supports into operative relation with the transferring mechanism and for causing the latter to deliver a part from one of the complemental supports to said movable support.

12. A machine for assembling parts of shoes having, in combination, a plurality of supports for shoe parts, mechanism for transferring a part from one support to another, and power operated mechanism for raising one support carrying a stack of shoe parts into position to deliver the topmost part to the transferring mechanism, including connections to a source of air supply and a relief valve for limiting the pressure upon the transferring mechanism as a shoe part is presented thereto.

13. A machine for assembling parts of shoes having, in combination, a plurality of supports for shoe parts, alternate supports being constructed and arranged to carry right and left parts, a plurality of holders constructed and arranged to carry respectively stacks of right and left parts, and automatic mechanism for relatively moving the supports and the holders and for transferring right and left parts from the stacks to alternate supports.

14. A shoe bottoming machine having, in combination, a shoe support, automatic mechanism for depositing a sole upon the bottom of a lasted shoe carried by said support, and automatic mechanism for relatively moving the support and the depositing mechanism into position for the deposit of the sole in predetermined relation upon the bottom of the shoe.

15. A shoe bottoming machine having, in combination, a support for a lasted shoe, automatic mechanism for depositing a shoe part upon a shoe carried by said support, and automatic mechanism synchronized with the depositing mechanism for bringing the support and the depositing mechanism into proper operative relation.

16. A shoe bottoming machine having, in combination, a support for a lasted shoe, intermittently acting power operated mechanism constructed and arranged to bring said support successively to a plurality of operating stations, and power operated mechanisms at successive stations for depositing shoe parts upon a shoe and for thereafter holding said parts under pressure for a substantial period of time.

17. A shoe bottoming machine having, in combination, a support for a lasted shoe, an intermittently acting power operated mechanism constructed and arranged to bring said support successively to a plurality of operating stations, power operating mechanism at one of said stations for transferring a sole from a source of supply and depositing it in proper position upon a lasted shoe, and mechanism at another station for holding the sole against the shoe under considerable pressure.

18. A shoe bottoming machine having, in combination, a support for a lasted shoe, means for bringing said support successively to a plurality of operating stations, mechanism at one station for depositing shoe filling material in proper position upon a lasted shoe, and mechanism at a succeeding station for depositing a sole in proper position upon said filled shoe.

19. A shoe bottoming machine having, in combination, a support for a lasted shoe, means for bringing said support successively to a plurality of operating stations, mechanism at one station for depositing shoe filling material in proper position upon a lasted shoe, mechanism at a succeeding station for depositing a sole in proper position upon said filled shoe, and mechanisms at succeeding stations for holding the sole and shoe under pressure for considerable periods.

20. A shoe bottoming machine having, in combination, a support for a lasted shoe, mechanism for operating upon a shoe carried by said support to prepare its bottom for a subsequent operation, mechanism for depositing a shoe part upon the bottom of the shoe thus prepared, and power operated means for relatively moving the support and the said mechanisms successively into predetermined relation for performing such operations upon the shoe.

21. A shoe bottoming machine having, in combination, a shoe support, mechanism for operating progressively around a portion of a shoe, mechanism for depositing a shoe part upon the shoe, and automatic means for relatively moving said support and said mechanisms successively into predetermined relation for operation of said mechanisms upon the same shoe carried by said support.

22. A shoe bottoming machine having, in combination, a shoe support, means for bringing said support successively to a plurality of operating stations, power operated means at one station for performing an operation progressively around a portion of a shoe, and mechanism at another station for depositing a shoe part upon the shoe.

23. A shoe bottoming machine having, in combination, a support for a welted shoe, means for bringing said support successively to a plurailty of operating stations, mechanism at one of said stations for trimming the inseam of a shoe, and mechanism at a succeeding station for depositing a sole in proper relation to the shoe.

24. A shoe bottoming machine having, in combination, a support for a welted shoe, means for bringing said support successively to a plurality of operating stations, mechanism at one of said stations for trimming the inseam of a shoe, and mechanism at a succeeding station for beating the welt.

25. A shoe bottoming machine having, in combination, a support for a welted shoe, means for bringing said support successively to a plurality of operating stations, mechanism at one of said stations for beating the welt, and mechanism at a succeeding station for depositing a sole upon the welt in proper relation to the shoe.

26. A shoe bottoming machine having, in combination, a support for a lasted shoe, a carrier therefor, power operated means for intermittently actuating it to bring said support successively to a series of operating stations, and mechanisms at the respective stations for trimming the inseam, depositing filling material, beating the welt, depositing a sole and pressing it upon the shoe.

27. A shoe bottoming machine having, in combination, a shoe support, and automatic mechanisms for depositing a sole upon a shoe carried by said support and for then subjecting it to successive pressures during a substantial period of time with an intermediate release of pressure.

28. A machine for assembling parts of shoes having, in combination, a plurality of supports for shoe parts, mechanism for transferring a sole part from one support to another, adhesive supplying means located in the path of said transferring mechanism and between the supports, automatic mechanism for causing the transferring mechanism to take a sole part from one support to present it to the adhesive supplying means and then to deliver it on a shoe part carried by the other support, and synchronized mechanism for subjecting the superposed parts to successive pressures.

29. A machine for assembling parts of shoes having, in combination, a support, separate mechanisms for delivering soles and shoe fillers successively to said support, and automatic mechanism for applying adhesive to the outer face only of a shoe filler after it has been deposited upon said support but before a sole to be assembled therewith has been deposited.

30. In a shoe bottoming machine, a support for a lasted shoe, adhesive applying means, a carrier for a shoe bottom part, and co-operating mechanism for first causing said means to apply adhesive to approximately a predetermined portion of the shoe and then causing said carrier to deliver a shoe bottom part upon the shoe.

31. In a shoe bottoming machine, a holder for a supply of shoe bottom parts, a support for a lasted shoe, adhesive applying means, a carrier for a shoe bottom part, and co-operating mechanism for causing said means to apply adhesive to a shoe and to cause the carrier to transfer a shoe bottom part from said holder to the shoe.

32. In a shoe bottoming machine, a holder for a stack of sheet fillers, a support for a welted shoe having a ribbed insole, a carrier, means for applying an adhesive to the insole, and other means for transferring a sheet filler from the holder to the carrier and for moving the carrier into co-operative relation with said support for delivering a filler to the bottom of the shoe within the insole rib and upon the adhesive.

33. In a shoe bottoming machine, a holder for a stack of sheet fillers, a support for a lasted shoe, a carrier movable from receiving position over the stack to delivering position over the shoe support, means for raising said holder to deliver the topmost filler to the carrier, and means for moving the carrier relatively to the insole of a lasted shoe to deliver the filler thereto.

34. In a shoe bottoming machine, a support for a lasted shoe, a turret upon which said support is carried, a support for a shoe bottom part, a carrier, and automatically controlled and operated mechanism for actuating said carrier to pick up a shoe bottom part from its support and deliver it in proper position upon the shoe carried by its said support.

35. In a shoe bottoming machine, a support for a welted shoe, a holder for a stack of soles laterally adjacent to said support, a rotary sole carrier, and automatically controlled and operated mechanism for causing said carrier to pick up the topmost sole in the holder and deliver it in proper position upon the shoe carried by said support.

36. A machine for assembling parts of shoes having, in combination, a plurality of supports for shoe parts, and mechanism for transferring a shoe sole from one of said supports to another comprising a carrier having a curved lower face approximately corresponding to the vertical shape of the sole to be transferred, said face being provided also with means for picking up the sole.

37. In a shoe bottoming machine, a plurality of supports for welted shoes, a turret upon which said supports are carried, automatic mechanism for rotating the turret intermittently to present different supports simultaneously at different positions, and automatic mechanisms located at such positions and synchronized with said rotating mechanism for performing different bottoming operations successively upon a shoe, including at least one operation performed progressively along the shoe.

38. In a machine for use in the manufacture of shoes, a rotary tool, a work support, means for continuously rotating the tool, a plurality of guides similar in shape to certain contours of the work, and means controlled by the guides to carry the tool around the work and to maintain the tool in proper operative relation to the work by moving said tool in a plurality of planes.

39. In a machine for use in the manufacture of shoes, a shoe support, a rotary tool for operating upon a shoe carried by said support, means for continuously rotating the tool, mechanism for moving the tool to carry the point of operation around the forepart of a shoe, and mechanism for supporting and guiding the tool constructed and arranged to effect relative movement of the tool and support in three directions with relation to the operating point in order to maintain the tool in proper operative relation to the work.

40. In a machine for use in the manufacture of shoes, a rotary inseam trimmer, means for continuously rotating the trimmer, means for carrying the trimmer around the forepart of a welted shoe, a plurality of guides corresponding to certain contours of the shoe, and means connected with the trimmer and engaging said guides to maintain the trimmer by movement in three directions in proper operative relation to the inseam to be trimmed.

41. In a machine for use in the manufacture of shoes, a shoe support, a plurality of guides having approximately the vertical and horizontal contours respectively of the part of a shoe to be operated upon, a rotary trimmer, mechanism carrying said trimmer and operatively connected to said guides for turning the trimmer in two directions about its point of operation and also for moving it vertically to maintain it in proper operative relation to the shoe, and positive geared connections from a source of power for continuously rotating the trimmer.

42. In a machine for use in the manufacture of shoes, a rotary trimmer constructed and arranged for movement in three directions with relation to its operating point, means for positively and continuously rotating the trimmer, and means whereby the trimmer may be adjusted in a direction transverse to the plane of its cutting edge.

43. In a machine for use in the manufacture of shoes, a conduit, an operating tool for separating material from a shoe, and automatic mechanism for moving the tool along the shoe and for bringing the tool and conduit intermittently into operative relation for delivering separated material from the tool to the conduit.

44. In a machine for use in the manufacture of shoes, a conduit, a concave operating tool for separating material from a shoe and constructed and arranged to retain within itself material thus separated, and automatic mechanism for moving the tool relatively both to the shoe and to the conduit and for bringing the tool and conduit intermittently into operative relation for delivering material accumulated within the tool into the conduit.

45. In a machine for use in the manufacture of shoes, a suction conduit, an approximately cup-shaped trimmer, and automatic mechanism for moving the trimmer around a portion of a shoe and for bringing it once in each cycle of operations into discharging relation to the conduit for delivering material accumulated within the trimmer into the conduit.

46. In a machine for use in the manufacture of shoes, a shoe support, a suction conduit, a rotary cup-shaped inseam trimmer, and automatic mechanism for moving the trimmer progressively around the forepart of a shoe carried by said support and for bringing the trimmer to rest, in respect to its travel around the shoe but while still rotating, in a position where the conduit communicates with the interior of the tool for removing material accumulated therein.

47. In a machine for use in the manufacture of shoes, a conduit, a concave tool constructed and arranged to separate material from a shoe and temporarily retain the separated material within itself, a carrier for said tool movable in a plurality of directions, a hood mounted on the carrier opposite the tool, and automatic mechanism for moving the tool and the hood to carry the point of operation progressively around the forepart of a shoe and to bring said parts to rest in operative relation with the conduit for removing from the tool material accumulated therein during one cycle of operations.

48. In a machine for use in the manufacture of shoes, a stationary conduit, an operating tool for separating material from a shoe, a collector movable with the tool and constructed and arranged to receive said material and deliver it to the conduit, and automatic mechanism for moving the tool and conduit along the shoe and for bringing them intermittently into operative relation for delivering separated material from the tool through the collector to the conduit.

49. In a shoe bottoming machine, a support for a welted shoe, a welt beating tool, and automatic means for moving and guiding the tool to cause the tool to operate upon the welt progressively around the forepart of the shoe.

50. In a shoe bottoming machine, a support for a welted shoe including a thin edged plate engaging the welt crease, a welt beating tool, means for actuating the tool, and automatic means for relatively moving and guiding the tool and support both vertically and horizontally to cause the tool to operate along the entire length of the welt.

51. In a machine for use in the manufacture of shoes, operating mechanism, a plurality of guides employed respectively for right and left shoes for controlling the operation of said mechanism, and automatic mechanism for bringing said guides alternately into operative position.

52. A machine for use in the manufacture of shoes having, in combination, a plurality of supports movable successively into operative position, alternate supports being constructed and arranged to carry right and left shoe parts, an operating tool, right and left guides for the tool, and connections between said guides and said supports for bringing a guide and the corresponding support into operative position in a predetermined timed relation.

53. A shoe bottoming machine having, in combination, a plurality of movable shoe supports, alternate supports being constructed and arranged to carry right and left shoes, a mechanism for operating upon shoes carried by said supports, a plurality of guides respectively for right and left shoes to control the operation of said mechanism, and means synchronized with the movement of said supports for throwing right and left guides alternately into and out of operation.

54. A shoe bottoming machine having, in combination, a plurality of movable shoe supports, operating mechanism, a movable block having a plurality of guides for controlling the operation of said mechanism on shoes carried by said shoe supports, and mechanism synchronized with the movement of said supports for shifting said block to bring said guides alternately into operative position.

55. In a machine for use in the manufacture of shoes, operating mechanism, a movable block, a plurality of guides respectively for rights and lefts interchangeable in position and carried by said block for controlling the operation of said mechanism, and a stationary block having a guide constructed and arranged to form a continuation of either of the guides in the movable block.

56. In a machine for use in the manufacture of shoes, an operating tool, a pair of complemental shiftable guides, and a stationary guide for said tool, said shiftable guides being movable alternately into operative position relative to the stationary guide.

57. In a machine for use in the manufacture of shoes, an operating tool, separate right and left guides for controlling the movement of the tool about the forepart of a shoe, and a single guide for controlling the movement of the tool about the heel parts of both right and left shoes, said forepart guides being movable successively into operative relation to the heel part guide.

58. A machine according to claim 54 in which the block is mounted upon a slidable rod so that it may readily be removed from the machine.

59. In a machine for use in the manufacture of shoes, a work support, a travelling tool, a stationary rack corresponding in shape to the forepart of a shoe, a pinion connected for movement with the tool and meshing with the rack, and power operated means for rotating the pinion to carry the tool progressively about the work.

60. In a machine for use in the manufacture of shoes, a shoe support comprising a crease engaging plate tapering to a thin edge and constructed and arranged both to support a shoe upon its upper surface and to extend along the greater part of the length of both sides of the forepart of the shoe, in combination with a tool for operating upon a shoe carried by said support, and automatic mechanism for causing said tool to travel around the forepart of the shoe.

61. In a shoe support, a sectional thin edged plate constructed and arranged to engage the crease of a welted shoe, the sections being relatively movable to clamp and to release the shoe, and a toe rest constructed and arranged to be moved into shoe clamping position by movement of one of the sections.

62. A shoe bottoming machine having, in combination, a plurality of movable shoe supports, a plurality of mechanisms for operating successively on lasted shoes carried by said supports, automatic mechanism for bringing said supports and said operating mechanisms respectively into predetermined relation, and means including separate motors for causing said operating mechanisms to operate simultaneously on different shoes while said supports are stationary.

63. A shoe bottoming machine having, in combination, a plurality of movable shoe supports, a plurality of mechanisms for operating successively on lasted shoes carried by said supports, automatic mechanism for bringing said supports and said operating mechanisms respectively into predetermined relation, means including separate motors for actuating said plurality of mechanisms, and means for starting and stopping the motors which actuate certain of said operating mechanisms, the latter means being controlled from another of the said operating mechanisms.

64. A shoe bottoming machine having, in combination, a shoe support, a plurality of mechanisms for operating successively on a shoe carried by said support, automatic mechanism for bringing said support and said operating mechanisms into predetermined relation, and an automatically acting controller for synchronizing the movements of said support and of said operating mechanisms.

65. A shoe bottoming machine having, in combination, a support for a lasted shoe before its heel is attached, an operating tool, mechanism for moving said tool, while said support is stationary, for performing a bottoming operation progressively and automatically along the margin of the forepart of a shoe, and guiding mechanism for moving said tool to maintain the tool in a predetermined angular relation to the contour of said forepart.

66. A shoe bottoming machine having, in combination, a support for a welted shoe, mechanism including a rotary tool for trimming the inseam of the shoe, power operated means for moving said tool progressively along the inseam, and guiding means for relatively moving said support and said tool to maintain the tool in a predetermined angular relation both to horizontal and to vertical contours of the shoe.

67. A shoe bottoming machine having, in combination, a support for a lasted shoe, separate mechanisms at different operating positions for performing bottoming operations upon the shoe before its heel is attached, and mechanisms for automatically presenting a shoe carried upon said support successively to said separate mechanisms and for causing the latter to travel around the forepart of the shoe.

68. A shoe bottoming machine having, in combination, a support for a lasted shoe, separate mechanisms for performing bottoming operations upon the shoe before its heel is attached, and automatically controlled and operated means for causing said mechanisms to travel successively around the forepart of the shoe.

69. A shoe bottoming machine having, in combination, a support for a lasted shoe, a plurality of tools located at different operating positions for performing bottoming operations upon the shoe, a plurality of power operated mechanisms for causing said tools to travel along the forepart of the shoe, power operated mechanism for moving said support to present the shoe carried thereby successively to said tools, and controlling means for causing the latter mechanism to operate alternately with said other mechanisms.

70. A shoe bottoming machine having, in combination, a support for a lasted shoe, automatic mechanism for presenting a shoe carried by said support successively at different positions, and automatic mechanisms located at such positions and synchronized with said other mechanism for successively performing different bottoming operations progressively along the shoe.

71. In a machine for use in the manufacture of shoes, the combination of a support for a welted shoe constructed and arranged to engage the welt crease of a shoe for a substantial distance along the shoe, a tool constructed and arranged to operate adjacent to the margin of the shoe, and automatic mechanism for causing said tool to act progressively along the forepart of the shoe.

72. In a machine for use in the manufacture of shoes, the combination of means constructed and arranged to support a welted shoe by engaging the welt crease of the shoe, an inseam trimming tool, a welt beating tool, and automatic mechanism for causing said tools to travel successively and progressively around the forepart of the shoe.

In testimony whereof I have signed my name to this specification.

FREDERICK M. FURBER.